US008294400B2

(12) United States Patent
Harmer

(10) Patent No.: US 8,294,400 B2
(45) Date of Patent: Oct. 23, 2012

(54) CLOSED LOOP CALIBRATION OF BACK EMF MEASUREMENT

(75) Inventor: Brent Jay Harmer, Johnstown, CO (US)

(73) Assignee: Seagate Technology LLC, Cupertino, CA (US)

( * ) Notice: Subject to any disclaimer, the term of this patent is extended or adjusted under 35 U.S.C. 154(b) by 611 days.

(21) Appl. No.: 12/355,940

(22) Filed: Jan. 19, 2009

(65) Prior Publication Data
US 2010/0182715 A1    Jul. 22, 2010

(51) Int. Cl.
*H02P 6/18* (2006.01)
(52) U.S. Cl. .................................. 318/400.34
(58) Field of Classification Search ........ 318/400.3, 318/400.34, 479, 504
See application file for complete search history.

(56) References Cited

U.S. PATENT DOCUMENTS

| 5,956,201 | A | 9/1999 | Pham et al. |
| 6,081,112 | A | 6/2000 | Carobolante et al. |
| 6,097,564 | A | 8/2000 | Hunter |
| 6,463,211 | B1 | 10/2002 | Peritore et al. |
| 6,690,536 | B1 | 2/2004 | Ryan |
| 6,795,268 | B1 | 9/2004 | Ryan |
| 6,914,745 | B2 | 7/2005 | Takeuchi et al. |
| 7,042,673 | B2 | 5/2006 | Jeong |
| 7,256,564 | B2 * | 8/2007 | MacKay ................. 318/400.34 |
| 7,385,364 | B1 | 6/2008 | Rana et al. |
| 7,421,359 | B2 | 9/2008 | Harmer et al. |
| 7,468,869 | B2 | 12/2008 | Yao et al. |
| 7,576,937 | B2 | 8/2009 | Nojiri et al. |
| 7,728,539 | B2 * | 6/2010 | Smith et al. ............. 318/400.34 |
| 7,787,211 | B2 | 8/2010 | Kim et al. |
| 7,800,855 | B2 | 9/2010 | Kuramoto et al. |
| 7,995,305 | B1 | 8/2011 | Ton-That et al. |
| 2005/0168862 | A1 | 8/2005 | Jeong |
| 2006/0214611 | A1 * | 9/2006 | Wang et al. ................. 318/254 |
| 2008/0030891 | A1 | 2/2008 | Kim et al. |
| 2008/0123216 | A1 | 5/2008 | Kuramoto et al. |
| 2010/0157467 | A1 * | 6/2010 | Tieu ................................ 360/75 |

* cited by examiner

Primary Examiner — Derek Rosenau
(74) Attorney, Agent, or Firm — David K. Lucente; Braden Katterheinrich

(57) ABSTRACT

A voice coil motor (VCM) is controlled by applying a bipolar square wave actuator current to the VCM and calibrating a back electromotive force (back-EMF) measurement on the VCM in response to the square wave actuator current. Back-EMF on the VCM is measured while an actuator arm coupled to the VCM is in motion, and the VCM is controlled to move the actuator arm in response to the measured back-EMF voltage.

18 Claims, 12 Drawing Sheets

CLOSED LOOP CALIBRATION OF BACK EMF MEASUREMENT

BACKGROUND

The present invention generally relates to systems with voice coil motors and, more particularly, to controlling velocity of a transducer using back-EMF measurements of an actuator motor.

Computer disk drives store information on disks or platters. Typically, the information is stored on each disk in concentric tracks. The data tracks are usually divided into sectors. Information is written to and read from a storage surface(s) of a disk by a transducer. The transducer may include a read element separate from a write element, or the read and write elements may be integrated into a single read/write element. The transducer is mounted on an actuator arm capable of moving the transducer radially over the disk. Accordingly, the movement of the actuator arm allows the transducer to access different data tracks.

The disk is rotated by a spindle motor at a high speed, allowing the transducer to access different sectors within each track on the disk. The actuator arm is coupled to a motor or coarse actuator, such as a voice coil motor (VCM), to move the actuator arm such that the transducer moves radially over the disk. Operation of the actuator is controlled by a servo control system. The servo control system generally performs two distinct functions: seek control and track following. The seek control function includes controllably moving the actuator arm such that the transducer is moved from an initial position to a target track position.

In general, the seek function is initiated when a host computer associated with the disk drive issues a command to read data from or write data to a target track on the disk. Once the transducer has been moved sufficiently close to the target track by the seek function of the control system, the track following function of the servo control system is activated to center and maintain the transducer on the target track until the desired data transfers are completed.

The transducer rides above the surface of the disk on an air bearing generated by the rotational motion of the disk. It is not desirable for the transducer to contact the disk surface, as such contact can damage the transducer and/or result in loss of data on the disk. Accordingly, when the disk drive is not being used to read/write data to/from the disk, it is desirable to "park" the transducer, i.e., move the transducer to a location so that it is not over a track that is used to store data. In some disk drives, the head is parked by causing the actuator arm to traverse a ramp, which pushes the transducer away from the surface of the disk. This process is referred to herein as a disk ramp unload process. When the actuator arm reaches the top of the ramp, the arm is latched into a storage position, so that the transducer will not collide with the disk surface if the disk drive is bumped or vibrated.

In order to read/write data to/from the disk, the transducer is unparked by releasing the actuator arm from the latch. A current signal to the voice coil motor causes the actuator arm to move down the ramp towards the disk, in a process referred to herein as a disk ramp load process. When the transducer reaches the end of the ramp, it is desirable for the transducer to be moving with the correct speed in order to maintain the transducer in proximity to the disk surface without causing a collision between the transducer and the disk surface. Therefore, it is desirable to monitor and control the speed of the transducer as it approaches the end of the ramp.

SUMMARY

A voice coil motor (VCM) is controlled by applying a bipolar square wave actuator current to the VCM and calibrating a back electromotive force (back-EMF) measurement on the VCM in response to the square wave actuator current. Back-EMF on the VCM is measured while an actuator arm coupled to the VCM is in motion, and the VCM is controlled to move the actuator arm in response to the measured back-EMF voltage.

Some embodiments are directed to operations for controlling a voice coil motor (VCM) in a disk drive including applying a bipolar square wave actuator current to the VCM, calibrating a back electromotive force (back-EMF) measurement on the VCM in response to the square wave actuator current, measuring back-EMF on the VCM while an actuator arm coupled to the VCM is in motion, and controlling the VCM to move an actuator arm in response to the measured back-EMF voltage.

Some embodiments provide a servo control circuit for controlling operation of a voice coil motor (VCM) including a series sense resistor. The servo control circuit includes a sense amplifier configured to receive a voltage across the sense resistor and to amplify the voltage by a voltage gain Ksense to generate an estimated IR voltage drop across the VCM and the sense resistor, a combiner configured to generate an estimate of back electromotive force (back-EMF) across the VCM in response to the estimated IR voltage drop and a total voltage across the VCM and the sense resistor, a high pass filter configured to generate a back-EMF error signal in response to the back-EMF estimate, and an integrator configured to integrate the back-EMF error signal to generate an adjusted value of Ksense.

Some embodiments are directed to operations for controlling a disk load process, such as in a disk drive, including performing a DC offset calibration to find DC offset as a function of a resistance gain Ksense, biasing an actuator arm of the disk drive against a crash-stop, applying a DC actuator current to the VCM, calibrating a back electromotive force (back-EMF) measurement on the VCM in response to the DC actuator current, measuring DC offset on the back-EMF, iteratively adjusting the value of Ksense in response to the measured DC offset until the value of Ksense converges, measuring back-EMF on the VCM while an actuator arm coupled to the VCM is in motion, and controlling the VCM to move an actuator arm in response to the measured back-EMF voltage.

DETAILED DESCRIPTION

Figure 1:
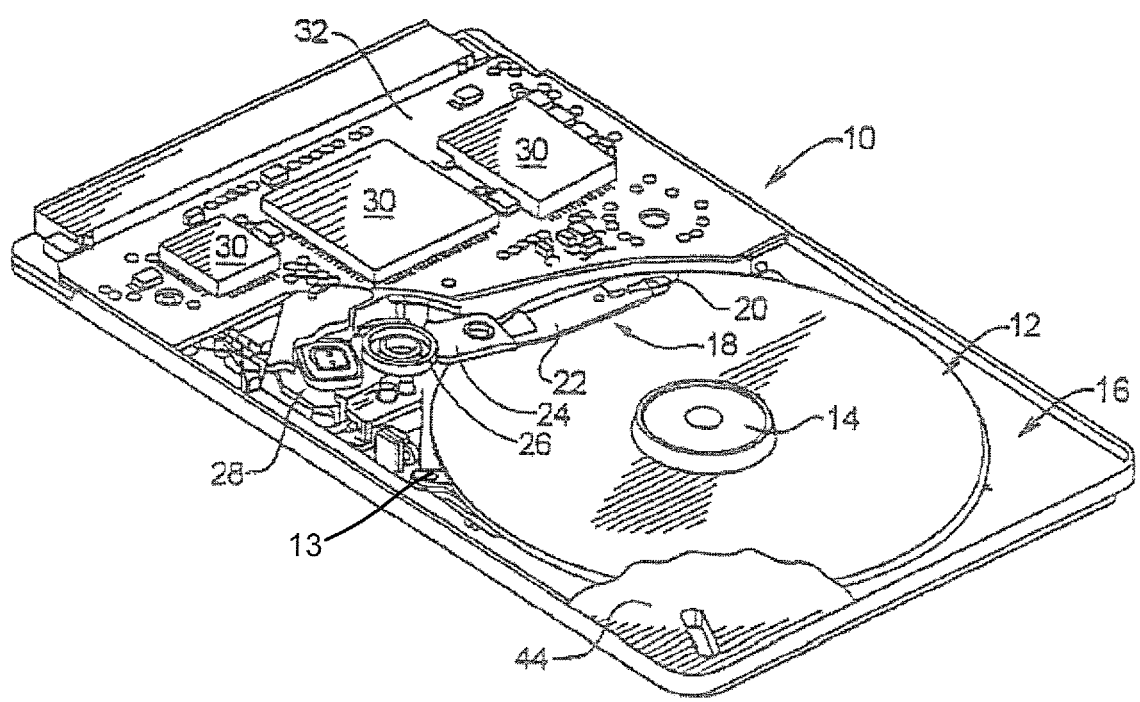
FIG. 1 is a perspective view of a disk drive in accordance with some embodiments.

Embodiments now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the present invention may be implemented in hardware (analog and/or discrete) and/or in software (including firmware, resident software, micro-code, etc.). As used herein, the term "signal" may take the form of a continuous waveform and/or discrete value(s), such as digital value(s) in a memory or register.

Embodiments of the present invention are described below with reference to block diagrams of disk drives, disks, controllers, and operations according to various embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 2:
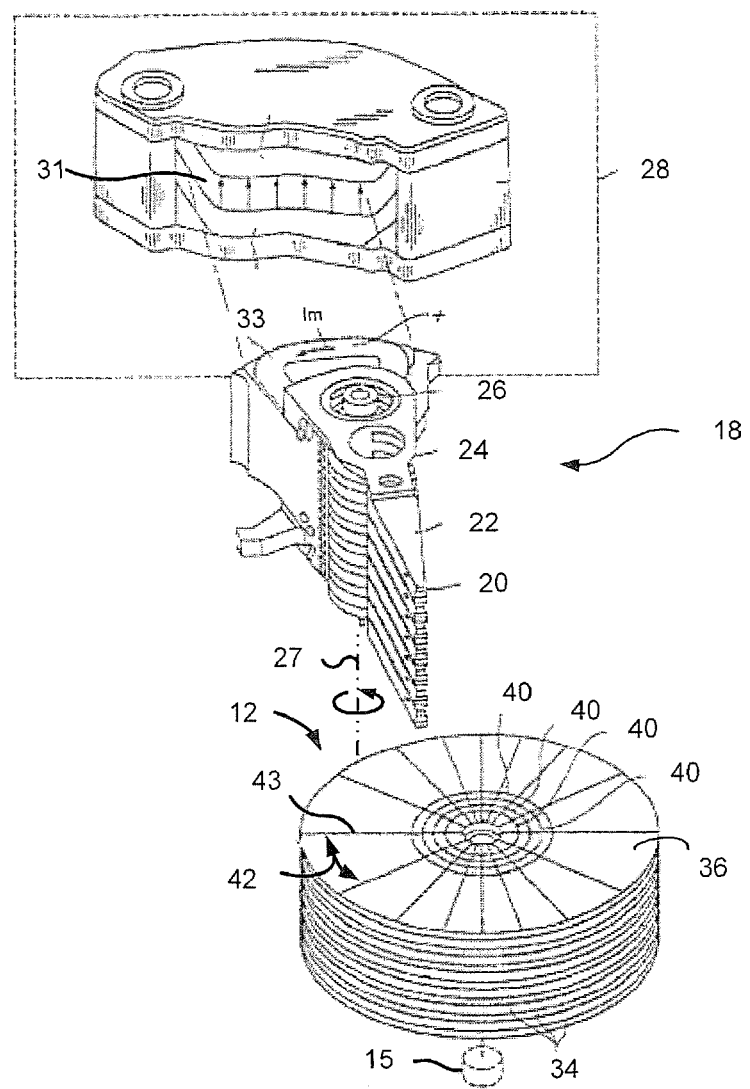
FIG. 2 is an exploded perspective diagram of a disk stack having a plurality of data storage disks along with an actuator assembly.

A simplified diagrammatic representation of a disk drive, generally designated as 10, is illustrated in FIG. 1. The disk drive 10 includes a disk stack 12 (illustrated as a single disk in FIG. 1) that is rotated about a hub 14 by a spindle motor 15 (FIG. 2). The spindle motor 15 is mounted to a base plate 16 within a housing 44. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a read/write head 20 (or transducer) mounted to a flexure arm 22 which is attached to an actuator arm 24 that can rotate about a pivot bearing assembly 26. The read/write head, or simply head, 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 15 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

The disk drive 10 further includes a ramp 13 positioned at the outer diameter (OD) of the disk stack 12 that can be used to park the read/write head 20, as discussed above.

Referring now to the illustration of FIG. 2, a voice coil motor (VCM) 28 includes a pair of fixed magnets that generate a magnetic field 31. The actuator arm assembly 18 is rotatably mounted on a spindle 26 and includes a VCM coil 33 at one end thereof. The VCM coil is positioned within the magnetic field 31 generated by the VCM 28. When an actuator motor current Im is passed through the VCM coil 33, a torque is generated on the actuator arm assembly 18, causing the actuator arm assembly 18 to rotate about an axis 27 corresponding to the spindle 26.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

The disk stack 12 typically includes a plurality of disks 34, each of which may have a pair of disk surfaces 36. The disks 34 are mounted on a cylindrical shaft and are rotated about an axis by the spindle motor 15. FIG. 2 further illustrates tracks 40 and spokes 43 on the disks 34. Data is stored on the disks 34 within a number of concentric tracks 40 (or cylinders). Each track 40 is divided into a plurality of sectors 42 separated by radially extending spokes 43. Each sector 42 is further divided into a servo sector and a data sector. The servo sectors of the disks 34 are used, among other things, to accurately position the head 20 so that data can be properly written onto and read from a selected one of the disks 34. The data sectors are where non-servo related data (i.e., host device data) is stored and retrieved.

Figure 3:
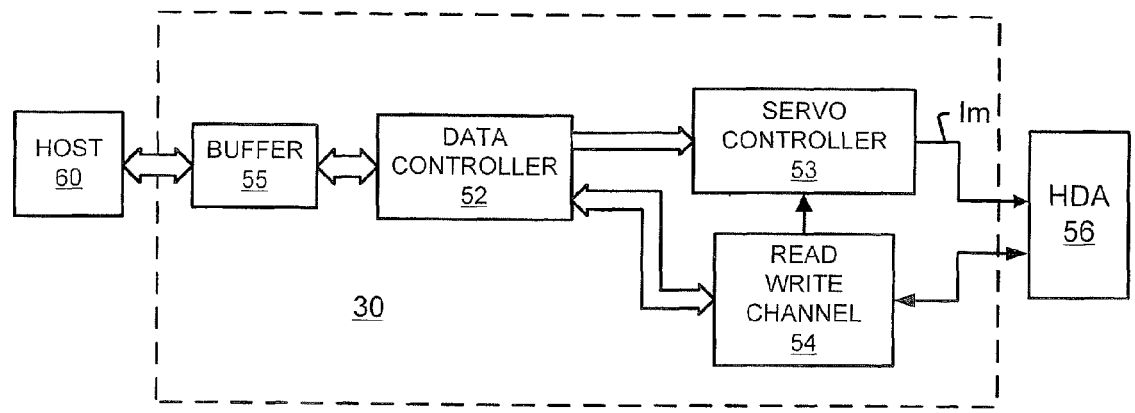
FIG. 3 is a block diagram of a portion of the controller of the disk drive shown in FIG. 1 and associated operations.

FIG. 3 is a block diagram illustrating a host device 60 that is communicatively connected to a portion of the controller 30 of the disk drive 10 shown in FIG. 1 according to some embodiments. The controller 30 can include a data controller 52, a servo controller 53, a read write channel 54, and a buffer 55. Although the controllers 52, 53, the buffer 55, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 56 can include a plurality of the disks 34, a plurality of the heads 20 mounted to the actuator arm assembly 18 and positioned adjacent to different data storage surfaces 36 of the disks 34, the VCM 28, and the spindle motor 15.

Write commands and associated data from the host device 60 are buffered in the buffer 55. The data controller 52 is configured to carry out buffered write commands by formatting the associated data into blocks with the appropriate header information, and transferring the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form conducted through the heads 20 in the HDA 56. The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34 by applying an actuator motor current Im to the VCM 28, and to maintain the head 20 aligned with the track while data is written/read on the disk 34.

To more accurately control the velocity of the flexure arms 22 and the heads 20 mounted thereon during a disk ramp load and/or unload process, it is desirable to monitor the velocity of the read/write head 20. The back-EMF voltage of the VCM coil 33 can provide a measure of the speed of the read/write head 20. The back-EMF voltage is a voltage that appears at the terminals of a coil when the coil is moved through an external magnetic field. The level of back-EMF that appears at the terminals of the VCM coil 33 is directly related to the velocity of the VCM coil 33. Accordingly, back-EMF can provide a measure of the velocity of the VCM coil 33, and, consequently, the velocity of the heads 20 mounted on the flexure arms 22.

Figure 4:
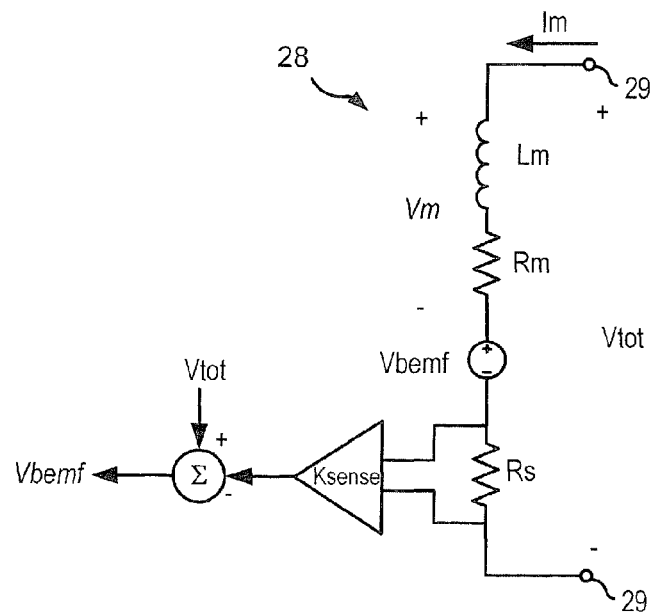
FIG. 4 is an equivalent circuit of a coil of a voice coil motor (VCM).

The back-EMF is not the only voltage component that can appear at the terminals of a VCM coil 33. For example, if a current, such as an actuator current Im, is flowing through the VCM coil 33, a voltage is induced across the VCM coil 33 due to the resistance and inductance of the coil VCM 33. FIG. 4 is a circuit diagram of a model of a VCM coil 33. The VCM coil 33 can be modeled as having a coil inductance Lm, a coil resistance Rm and a back-EMF voltage Vbemf. The combined voltage of the inductance Lm, the resistance Rm and the back-EMF Vbemf appears at the terminals 29 of the VCM coil 33. The voltage of the VCM coil 33 that results from current through the inductance Lm and resistance Rm of the VCM coil 33 is referred to herein as the "internal voltage" of the coil, and is denoted Vm. 100411 To measure the back-EMF of the VCM coil 33, one method is to place a sense resistor Rs in series with the VCM coil 33. The total voltage appearing across the VCM coil 33 and the sense resistor Rs is referred to herein as the "terminal voltage" of the VCM coil 33, and is denoted Vtot. Assuming that transient currents have dissipated, the total voltage Vtot is equal to the IR voltage drop across the VCM coil 33 plus the back-EMF voltage Vbemf. Therefore:

$$Vtot=Im(Rm+Rs)+Vbemf \quad (1)$$

Thus, Vbemf can be found as follows:

$$Vbemf=Vtot-Im(Rm+Rs) \quad (2)$$

Since the current Im through the VCM coil 33 is equal to Vs/Rs, Vbemf can be found as follows:

$$Vbemf=Vtot-(Vs/Rs)(Rm+Rs)=Vtot-Ksense*Vs \quad (3)$$

That is, if Ksense is set to be equal to (Rm+Rs/Rs), Vbemf can be determined based on the value of Ksense, Vtot and Vs. However, the coil resistance Rm and/or the sense resistance Rs may be unknown or variable (e.g., with temperature). In that case, Ksense can be found by setting Vbemf to zero (for example, by biasing the actuator arm against a crash-stop), and iteratively changing Ksense until Vtot−Ksense=0. Such a method of calibrating the value of Ksense may not be desirable, however, because it may take a relatively long time to perform the calibration. Furthermore, because the actuator arm must be biased against a crash-stop, it may not be possible to calibrate the value of Ksense while the transducers are positioned over the disk.

Figure 5:
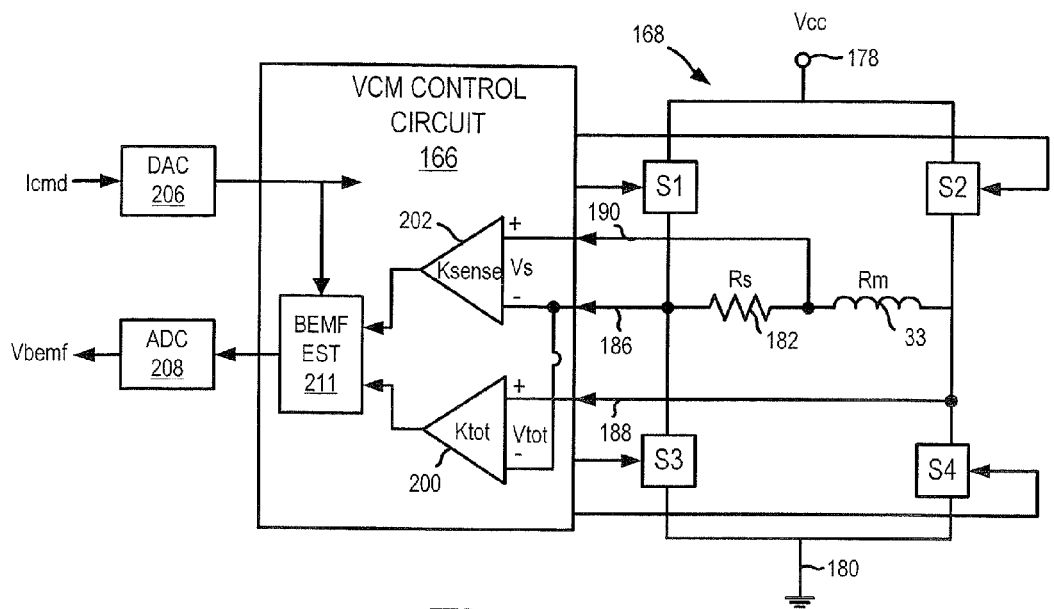
FIG. 5 is a circuit diagram of a VCM control circuit and an H-bridge circuit for controlling a VCM coil according to some embodiments.

Circuits and/or methods for calibrating a disk drive for accurate back-EMF calculations according to some embodiments are illustrated in FIG. 5. In particular, FIG. 5 provides a generalized schematic representation of relevant portions of the servo controller 53 of FIG. 3. A VCM control circuit 166 may use an h-bridge driver circuit 168 to supply bi-directional currents through the VCM coil 33 by controlling the states of switching devices S1-S4 in response to an actuator current command signal Icmd applied to the VCM control circuit 166 through a digital to analog converter (DAC) 206. The switching devices S1-S4 may include suitable field effect transistors (FETs) arranged between a Vcc voltage source 178 and a reference line (ground) 180.

In this way, current can be passed through the VCM coil 33 in a first direction through the selective energizing (induced source-drain conduction) of switches S1 and S4, and current can be passed through the VCM coil 33 in a second opposite direction through the selective energizing of switches S2 and S3.

A current sense resistor 182 having a resistance of Rs is placed in series with the VCM coil 33 as shown. The respective steady-state resistances of the VCM coil 33 (Rm) and the sense resistor 182 (Rs) may each be on the order of a few ohms. The difference between lines 186 and 188 represents the overall voltage drop across the VCM coil 33 and the sense resistor 182, i.e. Vtot. The difference between lines 186 and 190 represents the voltage drop Vs across the sense resistor 182, and the difference between lines 188 and 190 represents the voltage drop Vm across the VCM coil 33.

During I/O operation of the device 10, the servo controller 53 operates to position the read/write heads 20 either adjacent the disk stack 12 or adjacent the load/unload ramp 13. The VCM control circuit 166 is commanded by the servo controller 53 to provide a specified current Icmd (magnitude and direction) through the VCM coil 33. As noted above, at least in certain operational modes this current can be monitored using the relation Im=Vs/Rs, where Im is the actual current through both VCM coil 33 and the sense resistor 182, Vs is the voltage obtained from paths 186 and 190, and Rs is the known (or measured) resistance of the sense resistor 182.

As shown in FIG. 5, the VCM control circuit 166 includes a first sense amplifier 200 that senses the total voltage Vtot across the VCM coil 33 and the sense resistor Rs. The gain Ktot of the first sense amplifier may be unity in some embodiments. The VCM control circuit 166 further includes a second sense amplifier 202 that amplifies the voltage Vs across the sense resistor 182 by a resistance gain Ksense. The outputs of the first and second sense amplifiers 200, 202 are provided to a BEMF estimation circuit 211 that continuously provides an output voltage signal Vbemf through an analog to digital converter (ADC) 208. The output voltage signal Vbemf is proportional to the back-EMF across the VCM coil 33. This information can be used by the servo controller 53 to determine or estimate the velocity of the actuator arm 24 at times when the servo information is unavailable, such as when the heads 20 are being moved onto/from the ramp structure. The BEMF estimation circuit 211 effectively cancels the IR voltage drop associated with the VCM coil 33 and the sense resistor 182, so that the output signal Vbemf is entirely the result of back-EMF that is induced on the VCM coil 33 due to velocity of the actuator arms 24.

The BEMF estimation circuit 211 may, in some embodiments, subtract the output of the second sense amplifier 202 from the output of the first sense amplifier 200. The value of Ksense is calibrated so that the output ImRsKsense of the second sense amplifier 202 is equal to the total voltage drop Vtot=Im(Rm+Rs). That is, Ksense is calibrated so that:

$$Ksense = (Rm+Rs)/Rs \qquad (4)$$

When Ksense is thus properly calibrated, there is substantially no error voltage imparted to Vbemf by the voltage drop across the VCM coil 33 and sense resistor 182.

In preparation for a disk unload procedure, the value of Ksense may be calibrated according to some embodiments by applying a bipolar square wave signal to the VCM 33, measuring a BEMF error generated in response to the square wave, and adjusting the gain Ksense of the second sense amplifier in response to the BEMF error.

Figure 6:
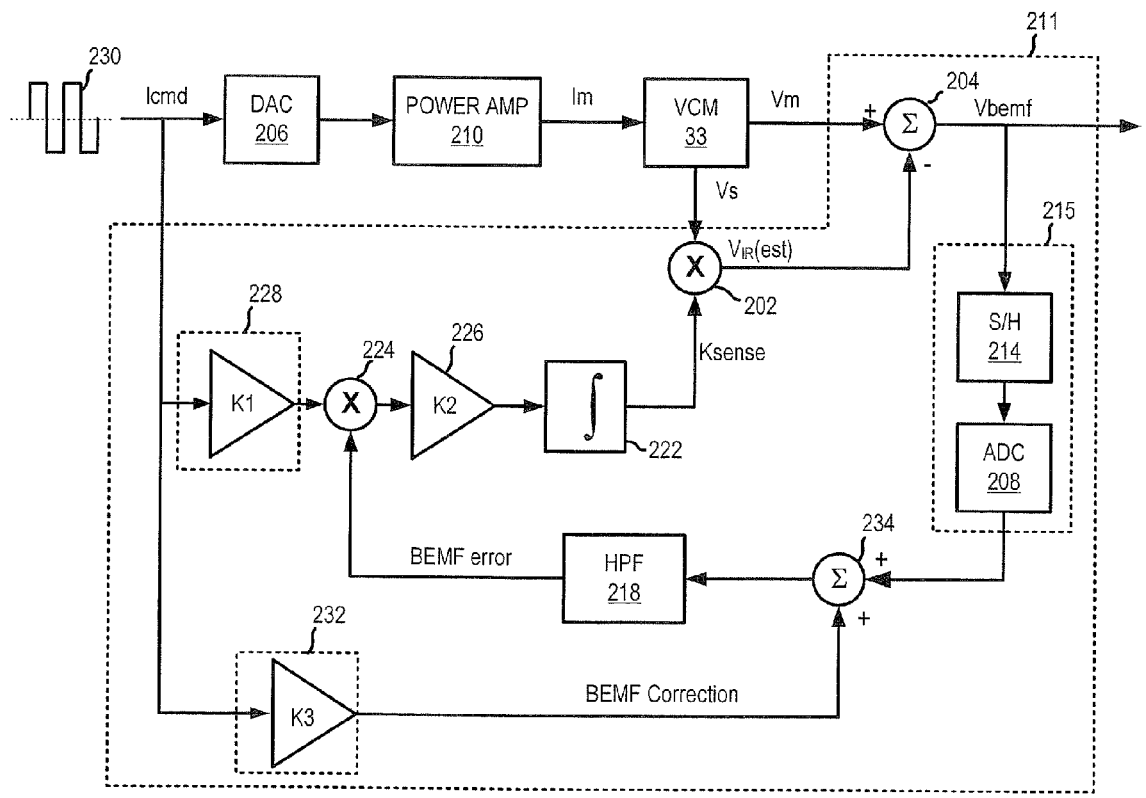
FIGS. 6 and 7 are block diagrams illustrating BEMF estimation circuitry for disk unload calibration according to some embodiments.

Circuits/methods for calibrating the gain Ksense during an unload procedure according to some embodiments are illustrated in FIG. 6, which illustrates a BEMF estimation circuit 211 in more detail. As shown therein, a bipolar square wave 230 is applied to a digital to analog converter (DAC) 206 at an input of the VCM control circuit 166. In some embodiments, the bipolar square wave 230 may have a fundamental frequency of, for example, 750 Hz. The bipolar square wave may have a relative small amplitude.

The output of the DAC 206 is applied to a power amplifier 210, which responsively generates the actuator current Im that is applied to the VCM 33. The total voltage Vtot across the VCM coil 33 and the sense resistor 182, as well as the voltage Vs across the sense resistor 182, are output by the VCM coil 33. The voltage Vs across the sense resistor 182 is multiplied by the gain Ksense in the second sense amplifier 202 (illustrated as a multiplier 202 in the block diagram of FIG. 6) to generate an estimated IR voltage drop $V_{IR}(est)$ across the VCM coil 33 and the sense resistor 182. The estimated IR voltage drop $V_{IR}(est)$ is subtracted at summing node 204 from the total voltage Vtot across the VCM coil 33 and the sense resistor 182 to obtain an estimate of the back-EMF voltage Vbemf across the VCM coil 33.

After waiting for a sufficient time for inductive transient voltage in the VCM coil 33 to dissipate, the estimated back-EMF voltage Vbemf across the VCM coil 33 is sampled by a sampling circuit 215 including a sample and hold circuit 214 and the ADC 208. To reduce noise in the Vbemf measurement, the value of Vbemf may be sampled by the sampling circuit 215 multiple times per half-cycle of the input signal 230. For example, the value of Vbemf may be sampled 64 times per half-cycle of the input signal 230 and the values averaged together to obtain a single estimate of Vbemf per half-cycle of the input signal 230.

The Vbemf signal may then be adjusted by adding a BEMF correction signal generated by a BEMF correction unit 232 to the Vbemf signal at a summing node 234. The BEMF correction signal may be a scaled version of the input current command signal Icmd. In some embodiments, the current command may be scaled by a BEMF correction amplifier in the BEMF correction unit 232 having a gain K3 that is based on the level of current supplied to the VCM coil 33. In a calibration performed before a disk unload procedure, the actuator arm 24 is positioned above the data storage surface of the disk 12. Thus, the applied square wave input 230 may cause slight movements in the actuator arm that may result in additional back-EMF imparted to the VCM coil 33. The BEMF correction signal may substantially cancel such additional back-EMF.

The adjusted Vbemf signal may be filtered by a high pass filter (HPF) 218 to generate a bipolar BEMF error signal that includes one value per half cycle of the input signal 230. To polarize the BEMF error signal, the BEMF error signal may be multiplied at a multiplier 224 by a normalized version of the input signal 230. That is, the input signal 230 is applied to polarity signal generator 228 that generates a polarity signal that is indicative of a polarity of the input signal 230. In some embodiments, the polarity signal generator 228 may include a normalizing amplifier having a gain K1 that scales the input signal 230 to unity amplitude (i.e. 1 or −1). The normalized value is then used to multiply the BEMF error signal to obtain a polarized BEMF error signal. The polarized BEMF error signal is then amplified by an amplifier 226 that scales the BEMF error signal by a desired learn rate, represented by the gain K2 of the amplifier 226. The scaled, polarized BEMF error signal is then integrated in an integrator 222 to generate an updated value of Ksense. As the circuit 211 processes successive values of the input signal 230, the gain Ksense is iteratively driven to a value that satisfies equation (4) above, so that the value of Vbemf output by the BEMF estimation circuit 211 accurately represents the back-EMF voltage on the VCM coil 33.

Figure 7:
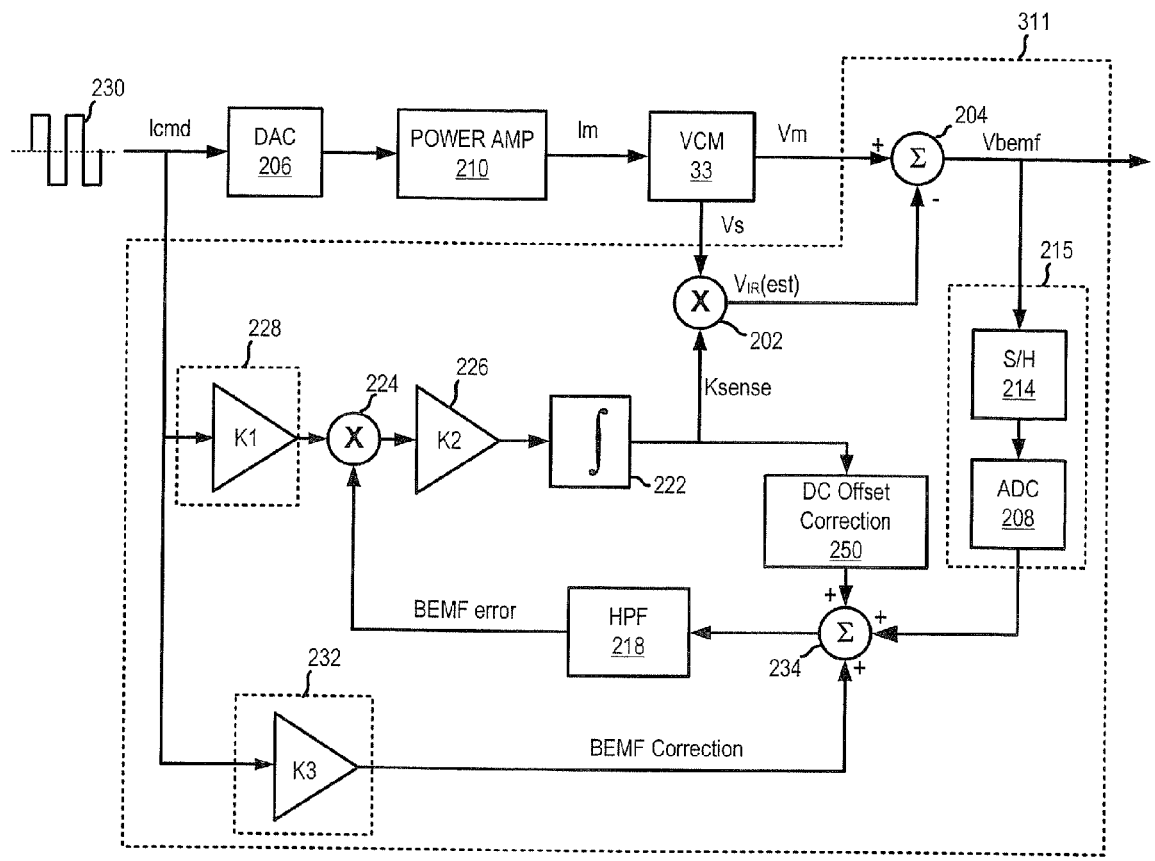

Referring to FIG. 7, a BEMF estimation circuit 311 is illustrated. The BEMF estimation circuit 311 is similar to the BEMF estimation circuit 211 illustrated in FIG. 6, except that the BEMF estimation circuit 311 includes a DC offset correction unit 250 that corrects DC offset bias in the BEMF signal that may be present based on the level of Ksense. Some level of DC offset that depends on the level of Ksense may be present in the back-EMF signal Vbemf. That is, due to hardware limitations, even at zero current, there may be some DC offset in the Vbemf signal that is based on the level of Ksense. When an unload command is received, an unload calibration of Ksense may be performed. At that point, the disk drive may have just finished a track following operation, in which case the actuator arm may have a very low velocity. The amount of DC offset that must be removed may then be calculated by determining a relationship between Ksense and the resulting DC offset. For example, such a relationship may be determined by applying a high value of Ksense and measuring a first resulting value of Vbemf, applying a low value of Ksense and measuring a second resulting value of Vbemf, and calculating a slope of Vbemf versus Ksense. The DC offset correction unit 250 may then generate a DC offset correction signal for the currently applied value of Ksense based on the slope of the DC offset vs Ksense curve. The DC offset correction signal is combined with the Vbemf signal at the summing node 234.

In particular embodiments, the DC offset used for velocity control during an unload process can be compensated as follows. First, DC offset can be measured at the beginning of the unload calibration using a nominal value of Ksense. At this point, the velocity of the actuator arm 24 is still close to zero, as the disk was previously in track following mode. The value of Ksense is toggled as described above between a high value and a low value to measure the slope of the DC offset versus Ksense curve. Calibration of Ksense is then performed as described above. At the end of the calibration, the DC offset is modified as follows:

$$DC\ \text{Offset(new)} = \\ DC\ \text{Offset(old)} + (Ksense(calc) - Ksense(nom)) * \frac{\Delta DC\ \text{Offset}}{\Delta Ksense} \quad (5)$$

where Ksense(calc) is the value of Ksense determined through calibration, Ksense(nom) is the nominal value of Ksense and $$\frac{\Delta DC\ \text{Offset}}{\Delta Ksense}$$

is the slope of the slope of the DC offset versus Ksense curve.

Figure 8:
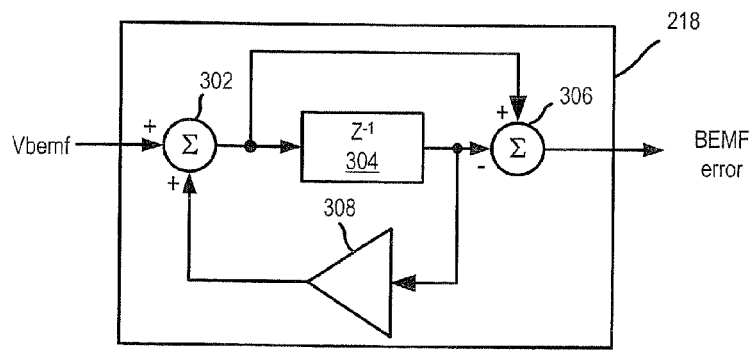
FIG. 8 is a block diagram illustrating a highpass filter for use with some embodiments.

The highpass filter 218 may be implemented as a digital and/or analog filter. In some embodiments, the highpass filter 218 may be implemented as a infinite impulse response (IIR) digital filter as shown in FIG. 8. The highpass filter 218 shown in FIG. 8 includes a first summing element 302, a delay element 304, a feedback amplifier 308 and a second summing element 306. The cutoff frequency of the highpass filter may be tuned to minimize or reduce the time required for the value of Ksense to converge. In some embodiments, the cutoff frequency of the highpass filter 218 may be between about 100 Hz and about 500 Hz. In particular embodiments, the cutoff frequency of the highpass filter 218 may about 300 Hz.

Figure 9:
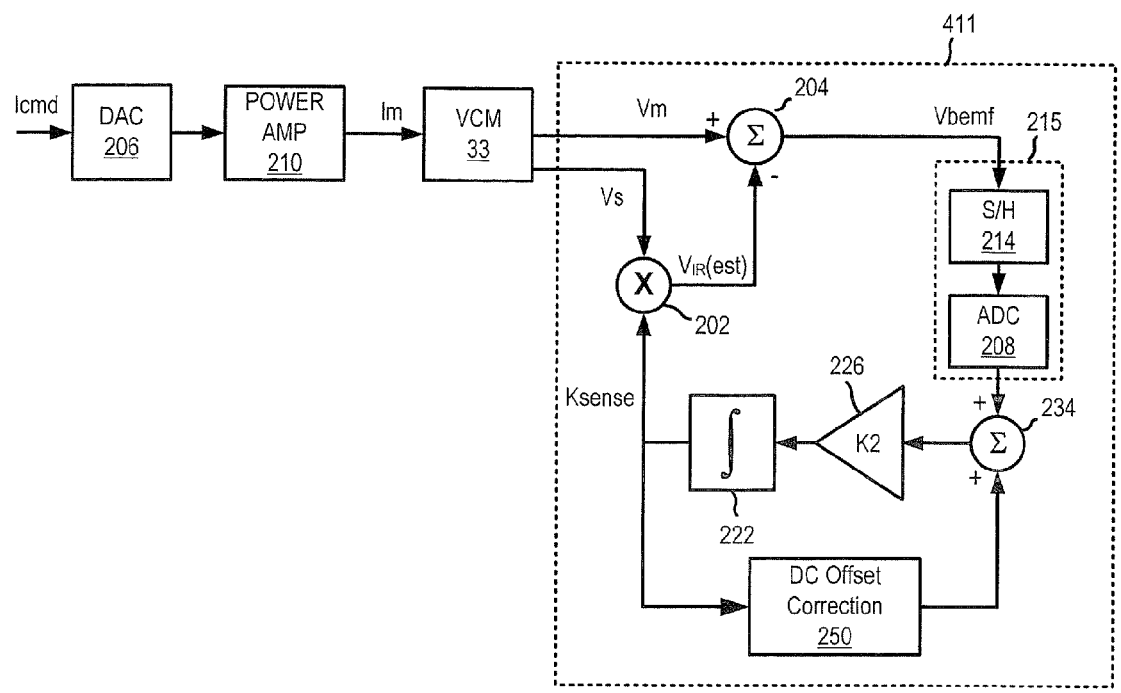
FIG. 9 is a block diagram illustrating BEMF estimation circuitry for disk load calibration according to some embodiments.

FIG. 9 illustrates a configuration of a BEMF estimation circuit 411 that may be useful for load calibration. Load calibration is performed before the actuator arm 24 is moved from the ramp 13 and over the disk stack 12. In a load calibration process according to some embodiments, because the actuator arm is already positioned adjacent the ramp and is stationary, the high pass filter 218 and the BEMF correction unit 232 can be omitted. In load calibration, a DC current signal Icmd can be applied to the DAC 206, and DC feedback can be used to iteratively adjust the value of Ksense.

Figure 10A:
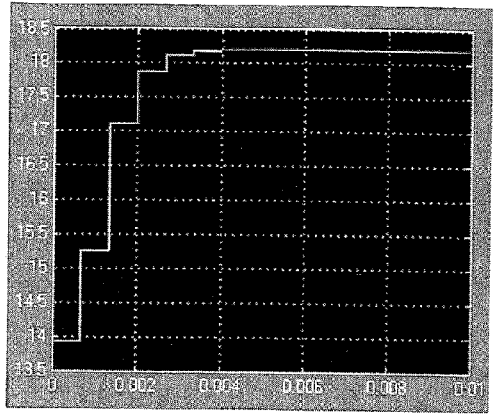
FIGS. 10A-10G are graphs illustrating convergence of Ksense for circuits configured according to various embodiments.

FIG. 10A-10G are simulation graphs illustrating convergence of Ksense for BEMF estimation circuits according to some embodiments. In particular, FIG. 10A illustrates simulated convergence of Ksense prior to an unload process for a BEMF estimation circuit in which the gain K2 of the amplifier 226 (i.e., the learn rate) is 0.366 and the cutoff frequency of the high pass filter 218 is 300 Hz. As shown in FIG. 10A, the value of Ksense converges to a steady state value in about 4 ms.

Figure 10B:
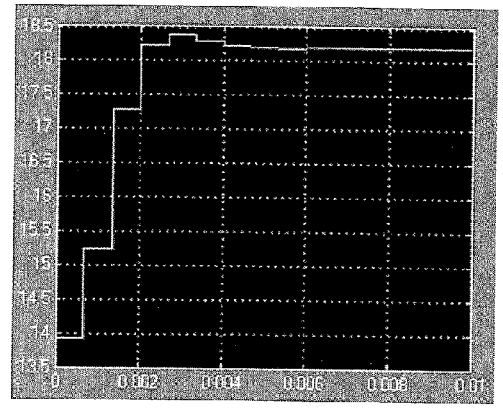
Figure 10C:
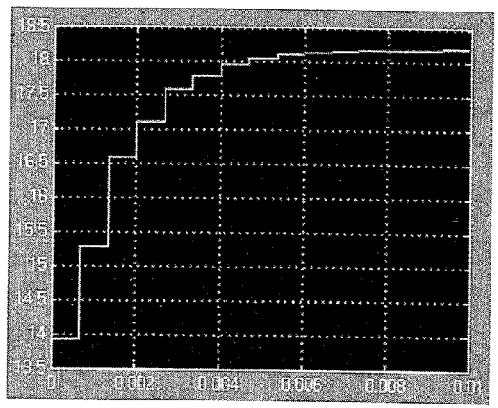

FIG. 10B illustrates the simulated convergence of Ksense with K2=0.366 and the cutoff frequency of the highpass filter 218 increased to 500 Hz, while FIG. 10C illustrates the simulated convergence of Ksense with K2=0.366 and the cutoff frequency of the highpass filter 218 reduced to 100 Hz. In both cases, the time required for the value of Ksense to converge is increased.

Figure 10D:
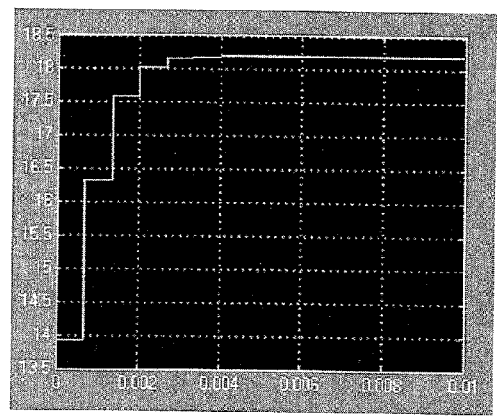

FIG. 10D illustrates the simulated convergence of Ksense with K2=0.366 and a cutoff frequency of 300 Hz in the presence of a DC offset of 0.1V, such as may occur if the actuator arm is moving at a constant speed, or that may be caused by hardware. As shown in FIG. 10D, the convergence of Ksense is largely unaffected by the presence of a slight DC offset.

Figure 10E:
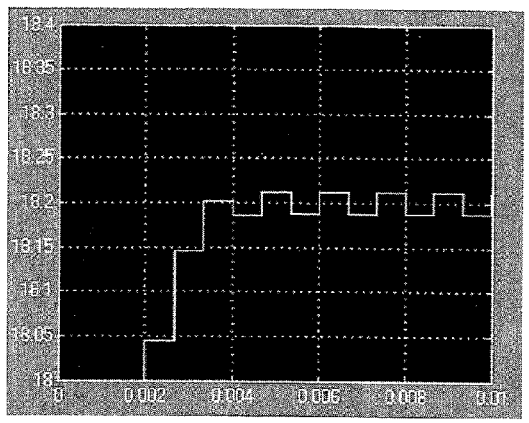

FIG. 10E illustrates the simulated convergence of Ksense with K2=0.366 and a cutoff frequency of 300 Hz in the presence of a 2 mA bias error. As shown in FIG. 10E, the value of Ksense oscillates about a converged value in the presence of the 2 mA bias error.

Figure 10F:
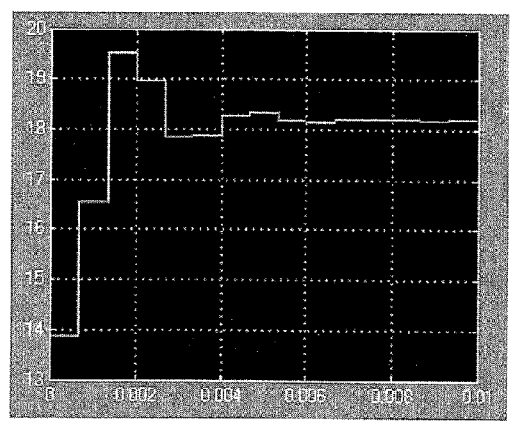
Figure 10G:
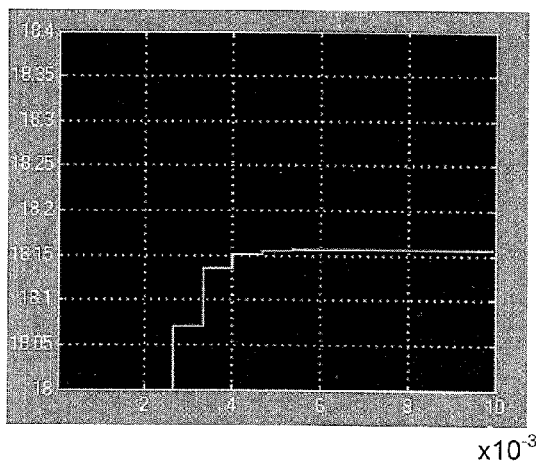

FIGS. 10F and 10G illustrate the effects of changes to the learn rate K2 on the convergence of Ksense. In particular, in the graph of FIG. 10F, the learn rate K2 was set at 0.732, while in the graph of FIG. 10G, the learn rate K2 was set at 0.183. When the learn rate K2 is increased, the value of Ksense responds more quickly to the BEMF error signal. However, there is some ringing evident in the graph of Ksense shown in FIG. 10F. In contrast, when the learn rate K2 is decreased as shown in FIG. 10G, the value of Ksense responds more slowly to the BEMF error signal.

A BEMF estimation circuit according to some embodiments may be relatively insensitive to changes in the torque constant of the actuator. The BEMF generated in response to motion of the actuator arm can be related to the velocity (vel) of the actuator arm as follows:

$$\frac{BEMF(V)}{vel(ips)} = \frac{Ke}{r}$$

where Ke is the BEMF constant (in V/rps), which is equal to the actuator torque constant Kt (in N–m/A), and r is the distance from the actuator pivot to the read/write head 20. According to some embodiments, a change in the actuator torque constant Kt of ±20% may result in an error in Ksense of only ±0.2%.

Figure 11A:
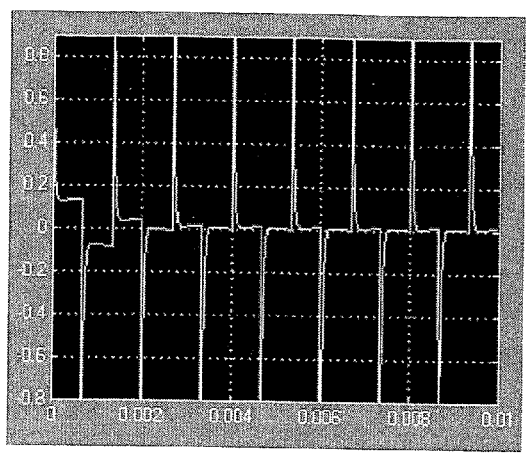
FIGS. 11A-11C are graphs illustrating BEMF error signals according to some embodiments.
Figure 11B:
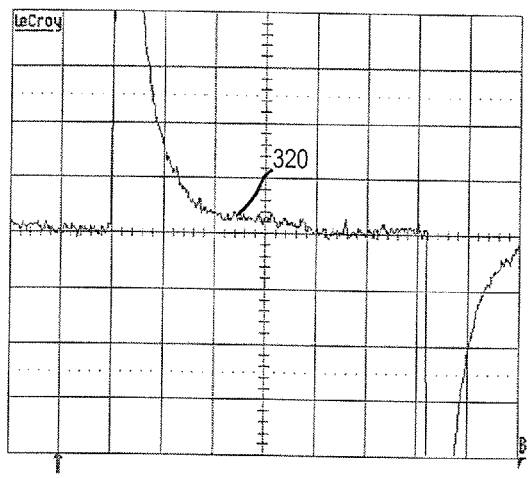
Figure 11C:
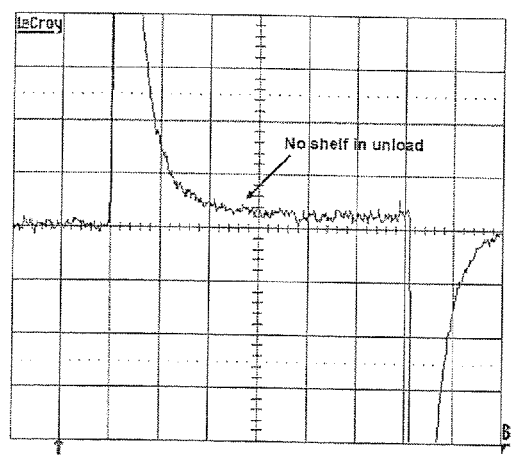

FIGS. 11A-11C illustrate BEMF error signals generated by a BEMF estimation circuit according to some embodiments in response to a square wave input signal. Referring to FIG. 11A, after each positive or negative pulse of the input signal, there is a corresponding spike in the BEMF error signal due to the inductive transients in the VCM coil 33. Thus, in each iteration, it is desirable to delay sampling of the BEMF signal until the inductive transients have dissipated.

However, the length of time that should be waited for the inductive transients to dissipate may depend on whether a load or unload calibration is being performed. For example, FIG. 11B illustrates a single period of the BEMF error signal during a load calibration, while FIG. 11C illustrates a single period of the BEMF error signal during an unload calibration. As shown in FIG. 11B, a distinct shelf 320 exists in the BEMF error signal that causes the BEMF error signal to deviate slightly from the expected exponential decay. The shelf 320 may last as long as 1.8 ms at 65° C. No such shelf is apparent in the BEMF error signal obtained during unload calibration, as illustrated in FIG. 11C. While not being bound by any theory, it is presently believed that the shelf 320 shown in FIG. 11B occurs as a result of compression and decompression of the actuator arm 24 against the crash stop.

Figure 12:
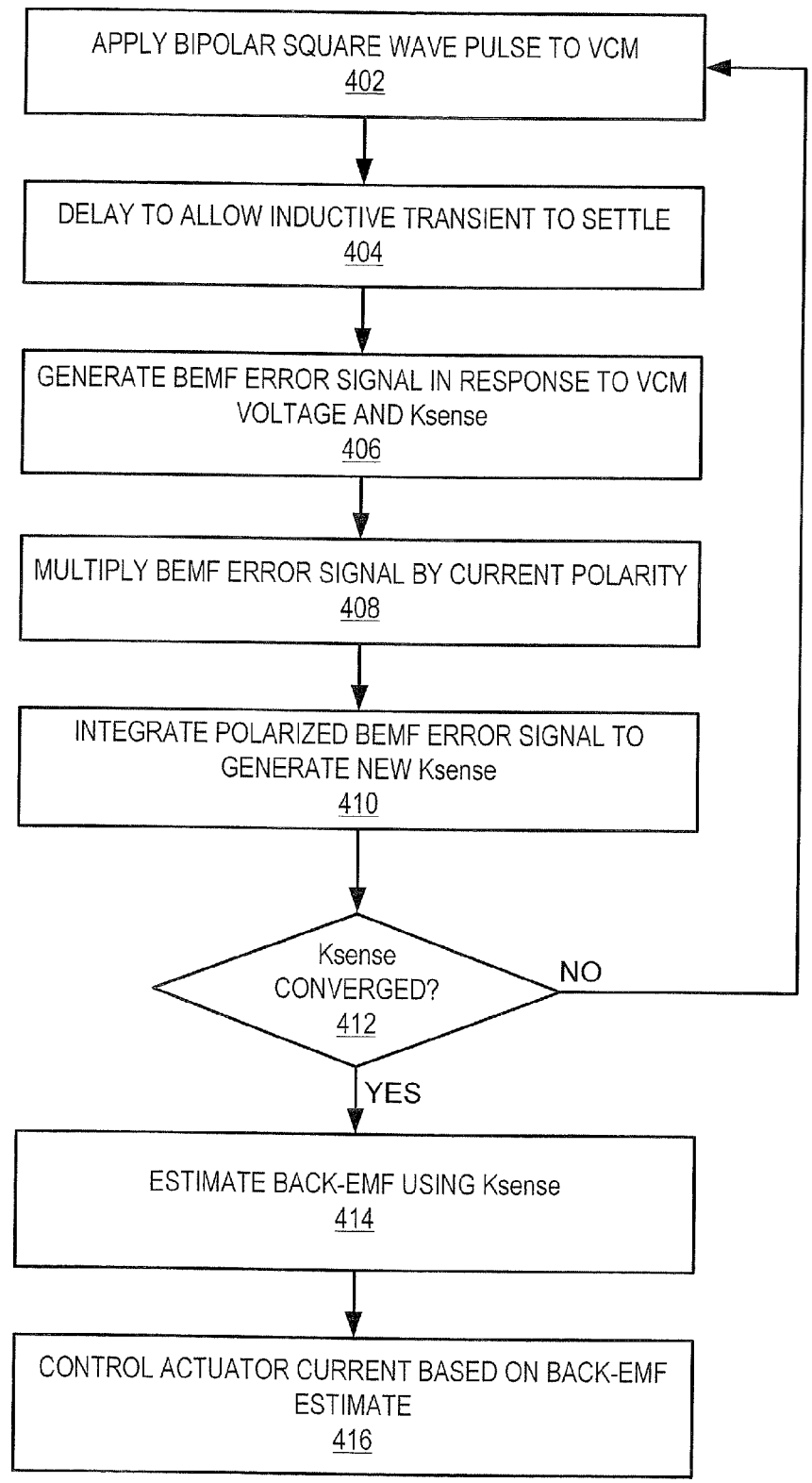
FIG. 12 is a flowchart illustrating systems/operations for disk unload calibration according to some embodiments.

FIG. 12 illustrates operations associated with calibrating BEMF measurements prior to a disk unload procedure. Referring to FIGS. 7 and 12, a bipolar square wave pulse 230 is applied to a VCM 33 after digital to analog conversion and amplification (Block 402). After allowing the inductive transient in the VCM 33 to settle (Block 404), a BEMF error signal is generated in response to the voltage across the VCM and a current value of Ksense. In particular, an estimate of the IR voltage drop over the VCM 33 and a sense resistor 182 (FIG. 5) is generated using the value of Ksense, and the estimated IR voltage drop is subtracted from the total voltage across the VCM 33 and the sense resistor 182 to obtain an estimate of the back-EMF voltage across the VCM 33 (Block 406). The back-EMF voltage estimate is filtered to obtain a BEMF error signal. Generation of the BEMF error signal from the back-EMF voltage is discussed in more detail below.

The BEMF error signal is multiplied by the polarity (±1) of the input current signal to generate a polarized BEMF error signal (Block 408). The polarized BEMF error signal is then integrated to generate a new value of the resistor gain Ksense (Block 410). In some embodiments, the polarized BEMF error signal may be multiplied by a learn rate K2 to control the rate of reaction of the resistance gain Ksense to the BEMF error signal.

The control system then checks to see if the value of Ksense has converged (Block 412). For example, the new value of Ksense may be compared to a previous value of Ksense, and if the difference between the two values is less than a predetermined threshold, then Ksense may be assumed to have converged. If Ksense has not converged, control may be returned to Block 402 and the loop may be repeated. If the value of Ksense has converged, that value may be used to estimate the back-EMF voltage on the VCM (Block 414), which can be used to control motion of the actuator arms 24 (Block 416).

Figure 13:
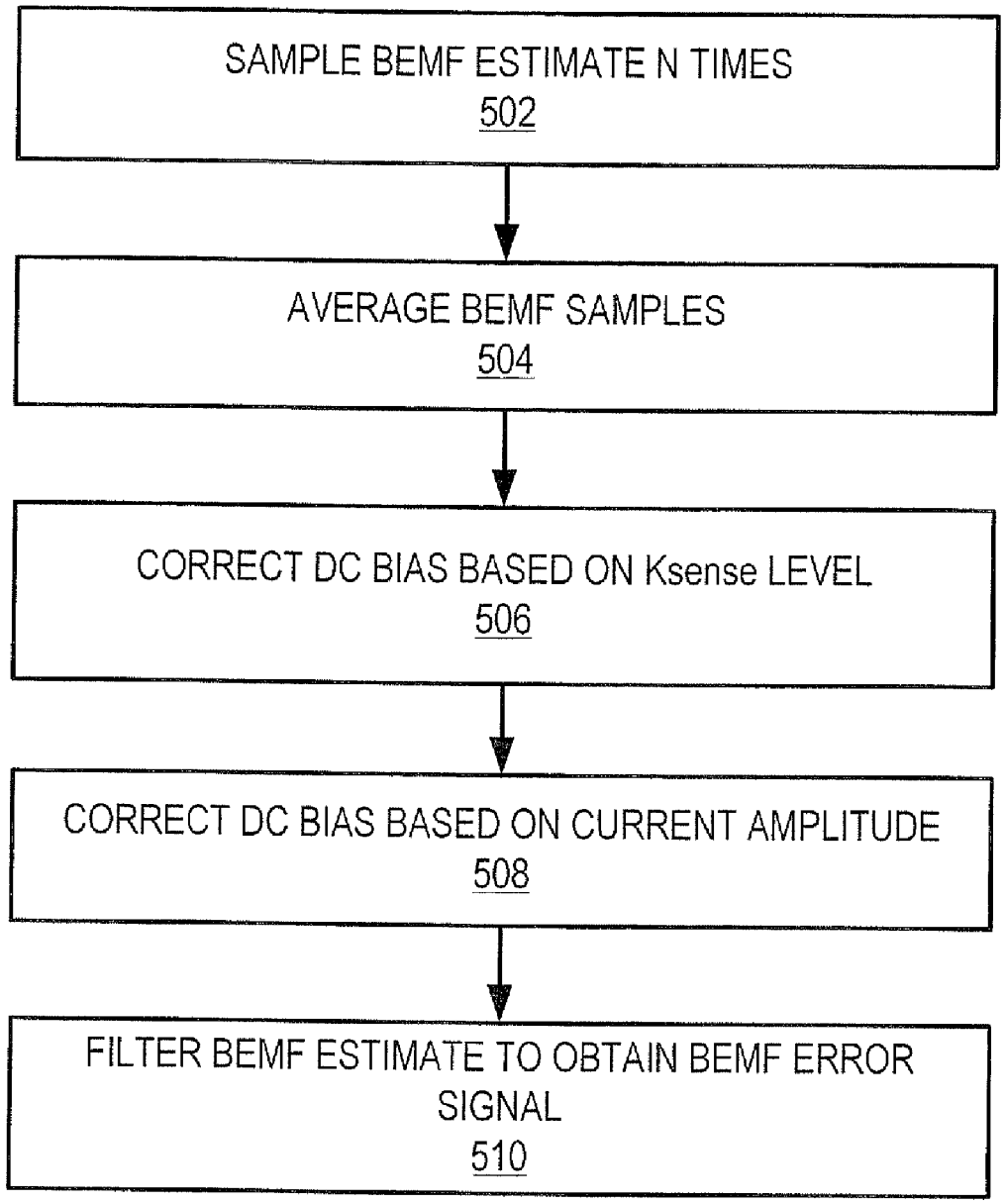
FIG. 13 is a flowchart illustrating systems/operations for BEMF error signal estimation according to some embodiments.

Generation of the BEMF error signal from the back-EMF voltage is illustrated in more detail in FIG. 13. As shown therein, after a delay to allow time for the inductive transient to decay, the back-EMF voltage signal may be sampled N times (Block 502). In some embodiments, the back-EMF voltage signal may be sampled 64 times. The back-EMF samples are then averaged to reduce noise in the back-EMF voltage estimate (Block 504).

Next, DC bias in the back-EMF voltage signal that is due to the level of Ksense is corrected (Block 506). For example, an estimate of the relationship between DC bias and Ksense level may be obtained as described above, and a DC bias estimate may be obtained based on the current level of Ksense and the slope of the DC bias versus Ksense curve.

A level of DC bias based on motion of the actuator arm in response to the applied square wave current is then determined and corrected in the back-EMF voltage estimate (Block 508). In some embodiments, this DC bias may be corrected by adding a BEMF correction signal to the back-EMF voltage signal, wherein the BEMF correction signal is generated by multiplying the input current signal by a gain K3.

The back-EMF signal may then be filtered by a highpass filter 218 to generate the BEMF error signal (Block 510).

Figure 14:
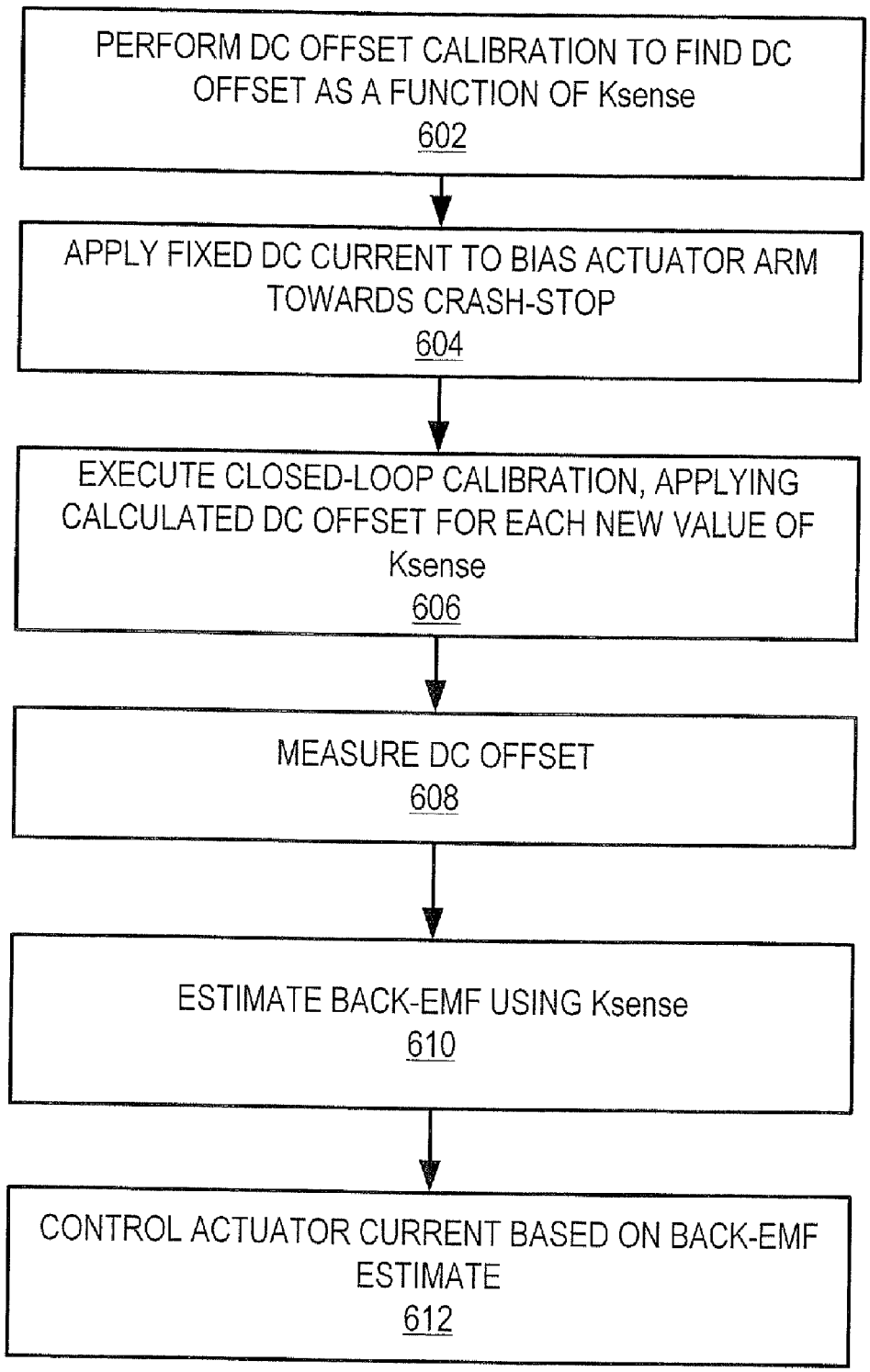
FIG. 14 is a flowchart illustrating systems/methods for disk load calibration according to some embodiments.

FIG. 14 illustrates operations associated with calibrating BEMF measurements prior to a disk load procedure. Referring to FIGS. 9 and 14, DC offset calibration is performed as described above to find an estimate of the relationship between DC bias and the Ksense level (Block 602). A DC bias estimate may then be obtained based on the current level of Ksense and the slope of the DC bias versus Ksense curve. A fixed DC current may then be applied to the VCM 33 that causes the actuator arm to be biased against the ramp 13 and/or a crash-stop (Block 604). The closed loop calibration process described above is then performed to iteratively obtain a converged value for Ksense (Block 606). Each time the value of Ksense is updated, a new DC offset value is generated based on the new level of Ksense and applied to the back-EMF value.

Once the value of Ksense has converged, the DC offset is again measured, for example, by applying low and high values of Ksense and determining a relationship between Ksense and the DC offset (Block 608). Furthermore, once the value of Ksense has converged, that value may be used to estimate the back-EMF voltage on the VCM (Block 610), which can be used to control motion of the actuator arms 24 (Block 612).

In the drawings and specification, there have been disclosed typical preferred embodiments and, although specific terms are employed, they are used in a generic and descriptive sense only and not for purposes of limitation, the scope being set forth in the following claims.

What is claimed is:

1. A method comprising:
   generating a polarity signal indicative of a polarity of a bipolar square wave current;
   measuring a back-EMF error in response to the bipolar square wave current applied to a voice coil motor (VCM);
   multiplying the back-EMF error by the polarity signal to generate a polarized back-EMF error signal; and
   adjusting the resistance gain in response to the polarized back-EMF error signal.

2. The method of claim 1, further comprising:
   integrating the polarized back-EMF error signal.

3. The method of claim 1, further comprising:
   estimating a back-EMF voltage on the VCM in response to the adjusted resistance gain.

4. The method of claim 3, further comprising:
   controlling a motion of an actuator arm in response to the estimated back-EMF voltage.

5. A method for correcting for DC offset bias in a back electromotive-force (back-EMF) signal, the method comprising:
   determining a relationship between the back-EMF signal and a resistive gain by:
      applying a high value of a resistance gain,
      measuring a first resulting value of back-EMF,
      applying a low value of a resistance gain, and
      measuring a second resulting value of back-EMF; and
   in response to the determined relationship, generating a DC offset correction signal for an applied value of the resistive gain.

6. The method of claim 5, further comprising:
   applying a bipolar square wave actuator current to a voice coil motor (VCM);
   calibrating a back-EMF measurement on the VCM in response to the bipolar square wave actuator current;
   measuring back-EMF on the VCM while an actuator arm coupled to the VCM is in motion; and
   controlling the VCM to move the actuator arm in response to the measured back-EMF voltage.

7. The method of claim 6, wherein calibrating the back-EMF measurement comprises:

measuring a voltage across the VCM generated in response to the bipolar square wave actuator current;

measuring a current through the VCM generated in response to the bipolar square wave actuator current;

multiplying the measured current by the resistance gain to generate an estimated IR voltage drop across the VCM;

subtracting the estimated IR voltage drop from the measured voltage to generate a back-EMF voltage estimate; and adjusting the resistance gain in response to the back-EMF voltage estimate.

8. The method of claim 7, further comprising:

filtering the back-EMF voltage estimate with a high pass filter to obtain a back-EMF error signal, wherein the resistance gain is generated in response to the back-EMF error signal.

9. The method of claim 8, further comprising:

integrating the back-EMF error signal to generate the adjusted resistance gain.

10. The method of claim 9, further comprising:

multiplying the back-EMF error signal by a learn rate before integrating the back EMF error signal.

11. A servo control circuit for controlling operation of a voice coil motor (VCM), the servo control circuit comprising:

a back electromotive force (back-EMF) error estimator configured to generate a back-EMF error signal in response to a back-EMF estimate;

an integrator configured to integrate the back-EMF error signal to generate an adjusted value of a voltage gain, Ksense;

a sense amplifier configured to receive a voltage across a sense resistor and to amplify the voltage by Ksense to generate an estimated IR voltage drop across the VCM and the sense resistor; and a first combiner configured to generate the back-EMF estimate across the VCM in response to the estimated IR voltage drop and a total voltage across the VCM and the sense resistor.

12. The servo control circuit of claim 11, further comprising:

a polarity signal generator configured to generate a polarity signal that is indicative of a polarity of an input signal applied to the VCM; and a multiplier coupled to the sense amplifier and configured to multiply the back-EMF error signal by the polarity signal to generate a polarized back-EMF error signal; wherein the integrator is configured to integrate the polarized back-EMF error signal.

13. The servo control circuit of claim 12, further comprising:

a second amplifier having an input coupled to an output of the multiplier and an output coupled to an input of the integrator, wherein the second amplifier is configured to amplify the polarized back-EMF error signal by a learn rate.

14. The servo control circuit of claim 13, further comprising:

a third amplifier coupled to an input of the VCM and configured to generate a correction signal in response to the input actuator current signal; and a second combiner that is configured to combine the correction signal with the back-EMF estimate.

15. The servo control circuit of claim 14, further comprising:

a DC offset correction module coupled to the second combiner and that is configured to generate a DC correction signal in response to the value of Ksense;

wherein the second combiner is configured to combine the DC correction signal with the back-EMF estimate.

16. The servo control circuit of claim 11, further comprising:

a sampling circuit coupled to the first combiner and configured to sample the back-EMF a plurality of times, and to average a plurality of samples of the back-EMF signal to reduce noise in the back-EMF.

17. The servo control circuit of claim 16, wherein the sampling circuit is configured to delay sampling the back-EMF voltage estimate after a change in polarity in an actuator current to allow an inductive transient in the back-EMF voltage to decay.

18. The servo control circuit of claim 11, wherein the back-EMF error estimator is a high-pass filter.

* * * * *